No. 862,277. PATENTED AUG. 6, 1907.
R. E. NOBLE.
SPRING FOR TROLLEYS AND HARPS.
APPLICATION FILED JAN. 13, 1905.

Witnesses:
A. Clifford Bean
M. C. Siktberg

Inventor,
Ralph E. Noble,
By Glenn S Noble
Att'y

UNITED STATES PATENT OFFICE.

RALPH E. NOBLE, OF CHICAGO, ILLINOIS.

SPRING FOR TROLLEYS AND HARPS.

No. 862,277.	Specification of Letters Patent.	Patented Aug. 6, 1907.

Application filed January 13, 1905. Serial No. 240,963.

*To all whom it may concern:*

Be it known that I, RALPH E. NOBLE, a citizen of the United States, residing at Chicago, in the county of Cook and State of Illinois, have invented certain new and useful Improvements in Springs for Trolleys and Harps, of which the following is a specification.

This invention relates more particularly to centralizing springs which are adapted to be used in connection with electric trolleys and their supporting harps or forks in order to maintain the trolley in a centralized position, and also serve to conduct more or less of the current from the trolley to the harp.

The invention consists more particularly of the improved spring, which will be described fully hereinafter, and in the combination of such spring with the trolley and harp. Its objects are to provide a simple, economical and efficient device for the purpose specified, which may be readily inserted in position and will be positive in operation, and such other particular advantages as will be pointed out hereinafter.

I am aware that heretofore, trolley springs or the like have been invented, but such springs have been found defective or inefficient for various causes, and the invention set forth in this application is designed to overcome such faults and objections.

Figure 1:
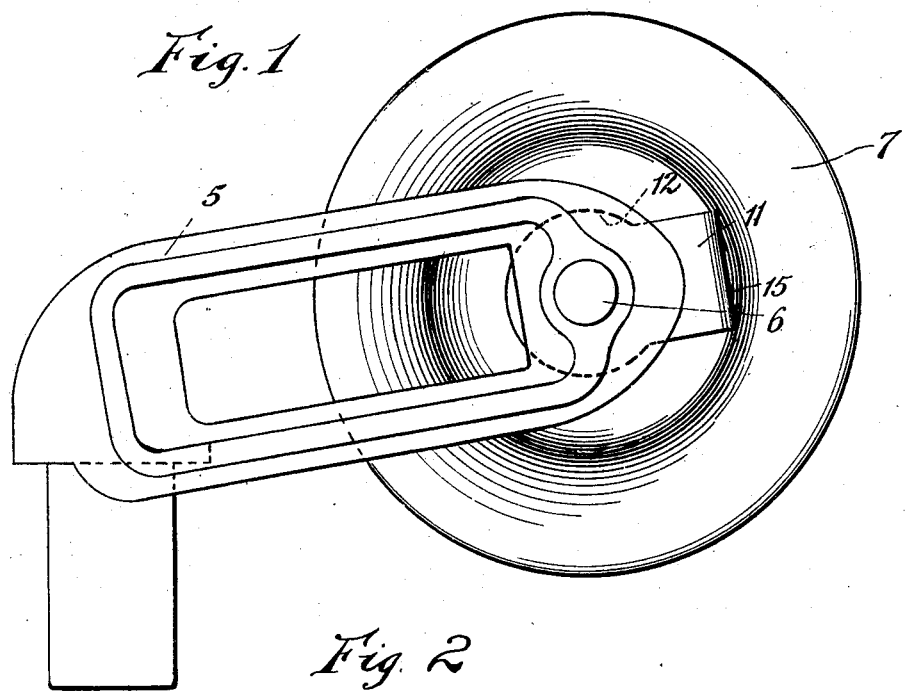
Figure 2:
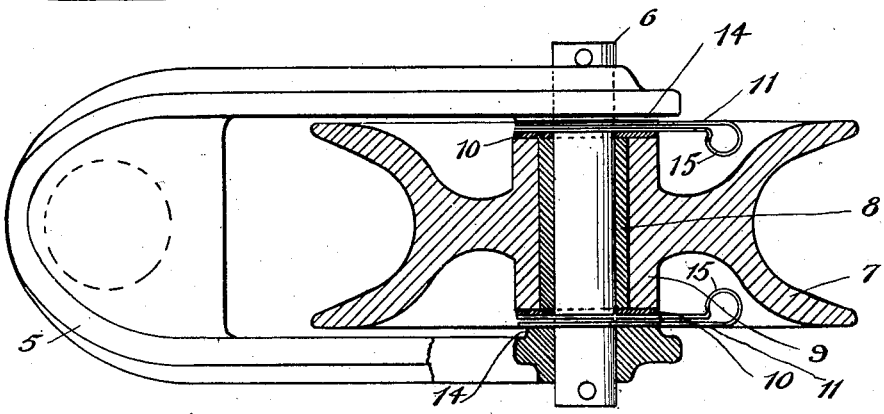
Figure 3:
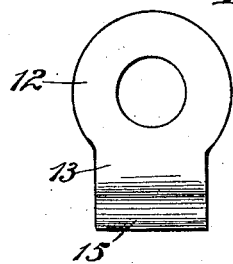
Figure 4:
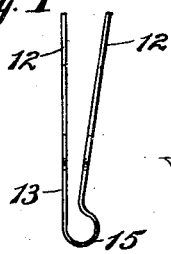

In the drawing accompanying this specification, Figure 1 represents a side view of a trolley and harp which may be of any ordinary or preferred form of construction, provided with springs embodying this invention. Fig. 2 is a top plan view of the same with parts broken away or shown in section for convenience in illustration. Fig. 3 is a side view of one of the springs, and Fig. 4 is an edge view of the same.

The trolley harp or fork 5 is provided with an ordinary shaft or pin 6 which carries a trolley or trolley wheel 7. The latter may be provided with lubricating means in any desired manner, the sleeve 8 representing any ordinary or preferred form of lubricating material or device.

At either end of the hub or central portion 9 of the wheel, is a washer 10, preferably made of copper or other suitable conducting material.

In order to hold the trolley or trolley wheel 7 centrally of the harp 5, and to prevent too great friction between the hub and the sides of the harp, I have provided the springs 11. The latter consist of two annuli or washers 12 which are connected by means of an integrally formed folded strip or tongue 13. This spring or double connected washer device is constructed so that the annular portions will normally extend out some distance apart, as shown in Fig. 4, so that when pressed together, they will exert an outward or longitudinal pressure against the end of the trolley hub and the inner side of the harp adjacent to the bearing for the pin. These springs 11 are inserted, as shown in Fig. 2, between the washer 10 and an insetting lug 14 on the inner sides of the harp arms. The loop or end 15 where the connecting part 13 is folded, may be formed in any desired manner, but I prefer to have it formed as shown, so that it will lie entirely upon one side of one of the annular portions. The projecting part of the loop 15 may be turned toward the wheel as shown in Fig. 2, in which case it will ordinarily project into the cut-away or recessed portion of the wheel adjacent to the hub. When in this position, the spring is free to turn with the wheel, or to remain stationary according to the amount of friction between it and the wheel or washer, and between it and the lug on the trolley arm. Ordinarily, a small amount of lubricating material will pass out around the washer so that the friction between the spring and the washer will be very slight and consequently the spring will only turn at occasional intervals.

These springs have the advantage over flat springs which have heretofore been used, having one end fastened to the trolley harp and the other end pressing against the end of the hub, inasmuch as they are more easily applied and are more positive in their action. With the former style, careless workmen are apt to make an insecure fastening to the harp or fail to give the springs the proper tension for pressing against the ends of the hub, while with my improved springs, no fastening is necessary, the springs are bound to have a proper tension, and adjust themselves more readily to make proper contact with the hubs and the harp arms. These springs are also located in such a position that they will not be subject to mechanical or electrical injury occasioned by the trolley or harp striking against the line wire, or supports, or other obstructions, and will not be injured by any arcs formed between the trolley or the harp and the main conductor. These springs may be readily stamped or formed from any suitable spring or resilient material, such as spring brass, with the eyes for the trolley pin or axle, and then bent up as shown in Fig. 4, for insertion in proper position as above described.

Although the form shown with the somewhat reduced connecting strip or portion 13, is convenient and neat appearing, I do not wish to limit myself to any particular form, as the spring may be formed of any suitable strip with the ends punched out or with one end punched and the other slotted in any ordinary manner.

Having thus described my invention, what I claim and desire to secure by Letters Patent is:—

1. A spring for trolleys and harps, comprising a bent strip of spring metal having a loop formed at one side at the point of bending and having corresponding perforations in the free ends adapted to engage with the pin or axle of the trolley harp.

2. The combination of a trolley-wheel, a harp or fork in which said wheel is mounted, and folded springs interposed loosely between the ends of the harp and the hub and engaging with the trolley axle the arrangement being such that the folded springs are free to turn with the wheel or to remain stationary according to the relative amount of friction between the different parts.

3. The combination of a trolley-wheel, harp and axle, of washers adapted to engage with the ends of the trolley-hub, and folded springs interposed loosely between said washers and the ends of the harp arms the arrangement being such that the springs are not attached to either the wheel or the harp and may turn with the wheel or remain stationary.

RALPH E. NOBLE.

Witnesses:
CHRIS BATHEUN,
B. P. TRACY.